(12) United States Patent
Suehiro et al.

(10) Patent No.: US 6,890,002 B1
(45) Date of Patent: May 10, 2005

(54) GAS GENERATOR

(75) Inventors: Akihiko Suehiro, Himeji (JP); Koji Tanaka, Himeji (JP); Takashi Saso, Himeji (JP)

(73) Assignee: Nippon Kayaku Kabushiki-Kaisha, Tokyo (JP)

( * ) Notice: Subject to any disclaimer, the term of this patent is extended or adjusted under 35 U.S.C. 154(b) by 0 days.

(21) Appl. No.: 10/030,939

(22) PCT Filed: Jul. 26, 2000

(86) PCT No.: PCT/JP00/04980

§ 371 (c)(1),
(2), (4) Date: Jan. 15, 2002

(87) PCT Pub. No.: WO01/07299

PCT Pub. Date: Feb. 1, 2001

(30) Foreign Application Priority Data

Jul. 28, 1999 (JP) ................................. 11/213351

(51) Int. Cl.$^7$ ............................................. B60R 21/26
(52) U.S. Cl. ..................................................... 280/741
(58) Field of Search ................................ 280/736, 741; 102/530, 531

(56) References Cited

U.S. PATENT DOCUMENTS

| | | | |
|---|---|---|---|
| 4,580,810 A | | 4/1986 | Thuen |
| 4,943,086 A | * | 7/1990 | Cunningham ................ 280/741 |
| 5,531,474 A | * | 7/1996 | Osborne et al. ............ 280/740 |
| 5,613,705 A | * | 3/1997 | Hock et al. .................. 280/741 |
| 5,829,785 A | * | 11/1998 | Jordan et al. ................ 280/741 |
| 6,053,531 A | * | 4/2000 | Katsuda et al. ............. 280/741 |
| 6,056,319 A | * | 5/2000 | Ruckdeschel et al. ...... 280/741 |
| 6,116,642 A | * | 9/2000 | Shirk et al. .................. 280/737 |
| 6,116,643 A | * | 9/2000 | Katsuda et al. ............. 280/741 |
| 6,123,359 A | * | 9/2000 | Cabrera et al. ............. 280/741 |
| 6,283,505 B1 | * | 9/2001 | Saso et al. ................... 280/741 |

FOREIGN PATENT DOCUMENTS

| | | |
|---|---|---|
| JP | 3-57747 | 3/1991 |
| JP | 7-329690 | 12/1995 |
| JP | 10-202086 | 6/1998 |
| JP | 10-287197 | 10/1998 |

* cited by examiner

Primary Examiner—David R. Dunn
(74) Attorney, Agent, or Firm—Oblon, Spivak, McClelland, Maier & Neustadt, P.C.

(57) ABSTRACT

It is an object of the present invention to provide a gas generator suitable for an organic-compound gas generating agent and excellent in heat resistance, pressure resistance, and sealing. In the gas generator, a housing (4) is formed by joining an iron- or steel-made upper lid (2), consisting of a top plate (2a) and a side cylinder (1a) extending downward from an entire circumferential edge thereof and provided with many gas discharge holes (8) with an iron- or steel-made lower lid (3), consisting of a bottom plate (3f), side cylinder (1b) extending upward from an entire circumferential edge thereof, and an ignitor holding portion (3a) formed integrally with the bottom plate (3f) and for fixing by caulking an ignitor (30). In the housing (4), the ignitor (30) and a gas generating agent (6) are arranged in the order mentioned from a center thereof.

8 Claims, 1 Drawing Sheet

GAS GENERATOR

TECHNICAL FIELD

The present invention relates to a gas generator for use in an airbag safety system for safely protecting a driver and occupant from an impact caused by a collision of an automobile or the like.

BACKGROUND ART

The gas generators of this type include the one having a housing made of an aluminum alloy, iron, or steel. Because a housing made of an aluminum alloy is readily molded compared to a housing made of iron or steel, in some housings, an ignitor holding portion for fixing an ignitor is integrally formed at a center of a lower lid, as disclosed in Japanese Unexamined Patent Publication No. Hei 10-081190. In some housings made of iron or steel, for example, an ignitor holding portion (a holder for an ignitor), that is another member, is fixed by welding on a press-formed lower lid, as disclosed in Japanese Unexamined Patent Publication No. Hei 11-078764.

In consideration of environment and safety, there is a tendency to change an azidation gas generating agent in which sodium azide is used to a nitrogen containing organic-compound gas generating agent.

However, a combustion temperature of the nitrogen containing organic-compound gas generating agent is likely to be high compared to that of the azidation gas generating agent. A higher pressure is required to keep the same level of burning characteristic and a housing made of an aluminum alloy and having a construction of a single cylinder has a limit in heat resistance and pressure resistance.

A housing should have a sealing construction to protect a gas generating agent from deterioration by moisture absorption. If an ignitor holding member is fixed by welding on the housing made of iron or steel, in addition to a welding process, there is a possibility that a problem occurs with regard to reliability in sealing of a welded portion. Therefore, from necessity to keep the reliability, a leak test should be carried out beforehand.

Similarly, in a case that the ignitor holding member is fixed by caulking, it is necessary to add a sealing member such as a packing, to fix by caulking, and to carry out a seal test.

In a case that a length in an axial direction (L) is shorter than a diameter (D) of a gas generator (L/D≦1), a lower lid cannot be so thick as to prevent a modification by a high internal pressure generated at the time of burning of a gas generating agent. If the lower lid is modified by a pressure generated at the time of burning of the gas generating agent, there may occur a leak of a combustion gas with a damage of a welded portion of an ignitor holding portion and unfixing of a caulking. There is an adverse possibility that the leaked combustion gas does not go through a cooling/filtering member.

It is an object of the present invention to solve various problems described above, specifically, to provide a gas generator suitable for a nitrogen containing organic-compound gas generating agent and excellent in heat resistance, pressure resistance, and sealing.

DISCLOSURE OF THE INVENTION

A gas generator of the present invention is so structured that a housing is formed by joining an iron- or steel-made upper lid, containing a top plate and a side cylinder extending downward from an entire circumferential edge thereof and provided with many gas discharge holes with an iron- or steel-made lower lid, containing a bottom plate, side cylinder extending upward from an entire circumferential edge thereof, and an ignitor holding portion formed integrally with the bottom plate and for fixing by caulking an ignitor. In the housing, the ignitor and a gas generating agent are arranged in the order mentioned from a center thereof. A flange extending horizontally outward from the side cylinder of the top plate is formed. The integral forming is done by a repetition of pressuring iron or steel to flow. The lower lid is formed into a ball like bowl-like shape. The ignitor holding portion comprises an inner side cylindrical portion standing on a wall thickness portion of the bottom plate of the bowl-like lower lid and holding the ignitor, a protruding portion protruding into a center from the inner side cylindrical portion and mounting the ignitor, and a bending portion extending from the inner side cylindrical portion, bending towards the center, and fixing the ignitor by caulking. Organic-compound gas generating agents containing mainly nitrogen are disposed in the housing.

Hence, the ignitor holding portion is formed integrally with the bottom plate in the gas generator of the present invention, a sealing test of the ignitor holding portion is not necessary. It is possible to protect the gas generating agent from deterioration by moisture absorption caused by a defective seal. Because the lower lid is made of high strength iron or steel, it is also possible to prevent the lower lid from being modified by a high internal pressure generated at the time of burning of a nitrogen containing organic-compound. The lower lid and the ignitor holding portion are formed integrally. As a result, it is possible to prevent a sealing portion from being damaged even if the lower lid is modified by the internal pressure.

Because the flange is formed on the upper lid side, the ignitor holding portion can be formed integrally on the lower lid side.

By a repetition of pressuring iron or steel to flow by partial forging, spinning or the like, it is possible to form the ignitor holding portion integrally with the lower lid even if the lower lid is made of iron or steel. Also, the lower lid is formed into a bowl-like shape. As a result, a high mechanical strength can be shown. As a result, it is also possible to prevent the lower lid from being modified by a high internal pressure generated at the time of burning of a nitrogen containing organic-compound.

The ignitor holding portion is formed by a repetition of pressuring iron or steel to flow, it is possible that the ignitor holding portion is formed integrally from the bottom plate into an interior of the housing in a standing shape. Therefore, a sealing of the ignitor holding portion is not necessary to be tested. As integrally formed, the ignitor holding portion can keep a high strength and prevent a seal from being damaged even if the lower lid is modified by the internal pressure generated at the time of burning of organic-compound gas generating agents.

As mounted on the lower lid over a wall thickness portion, the ignitor holding portion can keep a higher strength and prevent a seal from being damaged more reliably.

Because the ignitor holding portion is integrally formed, a wall thickness of the lower lid can be thickened even if L/D is no more than 1.

BEST MODE FOR CARRYING OUT THE INVENTION

Figure 1:
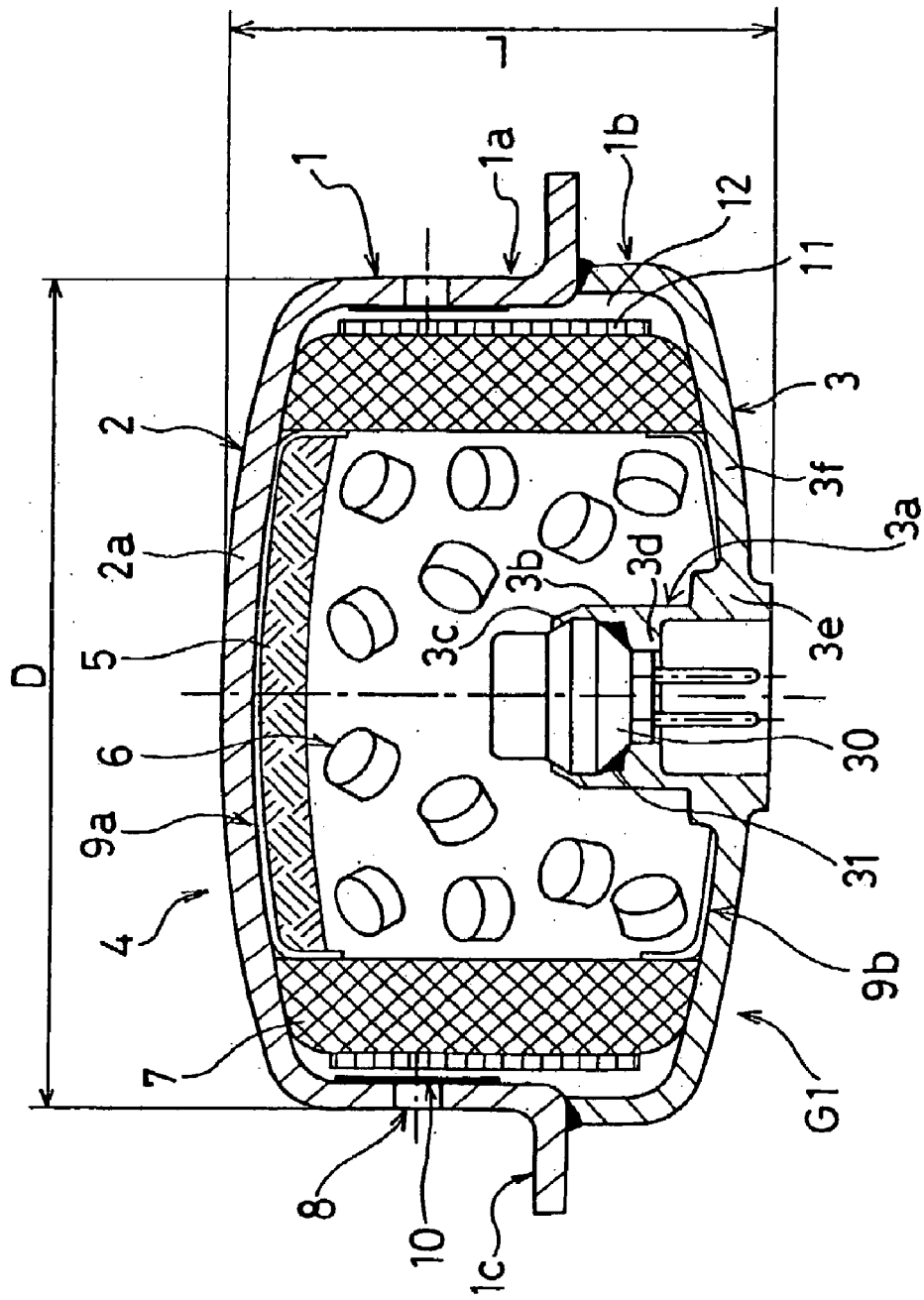
FIG. 1 is a schematic sectional view showing an entire structure of an example of a gas generator according to the present invention.

The embodiments of a gas generator according to the present invention will be described below with reference to the drawing. FIG. 1 is a schematic sectional view showing an example of the gas generator of the present invention. As shown in FIG. 1, a gas generator G1 is composed of an iron- or steel made upper and lower lids 2 and 3.

Iron or steel to be used may be wrought iron, iron, steel, steel alloy, and the like generally used in forging, spinning, and press-forming and the like and is not specifically limited.

The upper lid 2 is composed of a top plate 2a, a side cylinder 1a extending downward from the entire circumferential edge thereof and provided with many gas discharge holes 8, and a flange 1c extending horizontally outward from the side cylinder 1a and mounting an airbag module (not shown).

The lower lid 3 is composed of a bottom plate 3f, a side cylinder 1b extending upward from the entire circumferential edge thereof, and an ignitor holding portion 3a formed integrally with the bottom plate 3f and for fixing by caulking an ignitor 30.

The upper lid 2 and the lower lid 3 are formed by a repetition of partial pressuring to flow. In this case, the repetition of partial pressuring to flow means to partially repeat general forging and spinning processes. Therefore, the upper lid 2 and the lower lid 3 are made of a single plate-like iron or steel or a single block-like iron or steel by using a metal pattern for example, and combining methods of forging, spinning, pressing processes and the like.

By the partially repetition of pressuring to flow as described above, it is possible to form the top plate 2a and the bottom plate 3f of the upper lid 2 and the lower lid 3 into a bowl-like shape, wherein the lower lid has enough pressure resistance not to be modified by the internal pressure generated at the time of burning of a nitrogen containing organic-compound.

Because a flange 1c is formed with the upper lid 2 for mounting an airbag module, it is not required to excessively complicate a form of the lower lid 3 integrally formed with the ignitor holding portion 3a. As a result, the ignitor holding portion 3a can be formed integrally.

It is preferable that the ignitor holding portion 3a is formed in the center of the bottom plate 3f in view of strength. The ignitor holding portion 3 according to the embodiments of the present invention is composed of an inner side cylindrical portion 3b standing on a wall thickness portion 3e of the bottom plate 3f of the bowl-like lower lid 3 and holding the ignitor 30, a protruding portion 3d protruding into a center from the inner side cylindrical portion 3b and mounting the ignitor 30 over a packing 31, and a bending portion 3c extending from the inner side cylindrical portion 3b, bending towards the center, and fixing the ignitor 30 by caulking.

Because the inner side cylindrical portion 3b is formed to stand on the wall thickness portion 3e of the bottom plate 3f as described above, the ignitor holding portion 3a is excellent in mechanical strength. Therefore, the ignitor holding portion 3a is not damaged by an internal pressure generated in combustion of the gas generating agent 6 even if the lower lid 3 is modified. Also, the ignitor holding portion 3a is integrally formed, there is no problem on sealing and a leak test is not required. It is not required to form the inner side cylindrical portion 3b over the wall thickness portion 3e. The side cylindrical portion 3b may be formed to stand on the bottom plate 3f directly.

The upper lid 2 and the lower lid 3 formed as described above forms a single cylindrical housing 4 abutting and joining side cylinders 1a and 1b with each other. Hence, a joining method is electron beam welding, laser welding, friction welding and the like.

Because the gas generator G1 of the present invention has a housing construction of a single cylinder, the side cylinder 1 should bear all force added in an axial direction against the internal pressure generated by combustion of the gas generating agent 6. For a reason mentioned, it is preferable that a diameter (D) of the gas generator is no more than 70 mm. A length (L) in an altitudinal direction is preferable to be no more than 70 mm for a passenger seat and no more than 40 mm for a driver's seat to be incorporated in an airbag module (not shown).

A cooling/filtering member 7 is mounted throughout the upper lid 2 and the lower lid 3 in the housing 4 and a gas generating agent 6 is loaded being held by a cushion member 5 and a fixing lid member 9a therein. A ring member 9b having an L-shaped section is disposed abutting with a lower end of the cooling/filtering member 7 at the inside thereof. Both the fixing lid member 9a and the ring member 9b have a function of preventing a generated gas from flowing out from a gap between an inner surface of the housing and the cooling/filtering member 7. The gap appears by a modification of the housing 4 which occurs when the gas generator G1 actuates. A cylindrical punched metal 11 having many holes on an outer periphery thereof is disposed on an outer periphery of the cooling/filtering member 7. The punched metal 11 has a function of preventing the cooling/filtering member 7 from being crushed by a gas pressure generated when a gas generating agent 6 burns and closing a space 12. The punched metal 11 reliably discharges a gas generated by combustion of the gas generating agent 6 through a gas discharge hole 8.

On inner surfaces of a large number of gas discharge holes 8 provided on the side cylinder 1a of the upper lid 2, a sealing member (e.g., an aluminum foil member) 10 is stuck and keeps inside of the housing 4 airtight with a packing 31 abutting on the ignitor holding portion 3a.

Next, an assembling process of the gas generator G1 shown in FIG. 1 will be described based on the drawing. First, the packing 31 is abutted on the ignitor holding portion 3a of the lower lid 3 and the ignitor 30 is fixed by caulking. Then, the ring member 9b is put in and the cooling/filtering member 7 is inserted. And then, the gas generating agent 6 is loaded inside the cooling/filtering member 7 and the fixing lid member 9a is disposed over the cushion member 5. The gas discharge hole 8 is covered with the upper lid 2 sealed by the sealing member 10 and the lower lid 3 and the upper lid 2 are joined. As a result, the gas generator G1 shown in FIG. 1 is integrated.

Next, an operation of a gas generator of the present invention will be described taking the gas generator shown in FIG. 1 for instance. When a collision detecting device mounted in a vehicle detects a collision of the vehicle, the ignitor 30 ignites in response to a detection signal and the gas generating agent 6 is ignited by a flame of ignition. Then, a high-pressure gas starts to be generated by combustion of the gas generating agent 6. When gas pressure in the housing 4 rises and reaches a predetermined pressure, the sealing member 10 bursts and a high-pressure gas spouts out of the gas discharge holes 8 and instantaneously inflates an airbag (not shown).

A slag generated at the time of combustion of the gas generating agent 6 is collected and cooled in a process of passing through the cooling/filtering member 7 and supplied for the airbag. A temperature and a pressure in the housing 4 become instantaneously high after combustion starts. Housing structural members (the side cylinder 1, the upper lid 2 and the lower lid 3) made of iron or steel can be thinner in thickness than one made of an aluminum alloy. It is possible to make component members (the side cylinder 1, the upper lid 2 and the lower lid 3) to be thin by using iron or steel compared with using an aluminum alloy. It becomes easy to apply even an organic-compound gas generating agent which is hard to be used for a housing made of an aluminum alloy. The kind of types of applicable gas generating agents can be increased and the gas generator can be readily designed.

In a gas generator, wherein a length (L) of a housing is shorter than a diameter (D) thereof (a gas generator, wherein L/D is no more than 1), if the upper lid 2 and the lower lid 3 are thick, the gas generating agent cannot be loaded sufficiently. Therefore, increase of weight is required to be controlled. There is an upper limit to the thickness of the upper lid 2 and the lower lid 3 for a reason mentioned above. A design, wherein the upper lid 2 and the lower lid 3 are not damaged but allowed to be modified, is desired. Particularly, the lower lid 3 requires to have an ignitor holding portion. In a case where the ignitor holding portion is fixed by welding or caulking as another member, it is hard to prevent a damage of a fixing and joining portion accompanied with a modification thereof in a design in which the modification is allowed. However, the damage can be readily prevented because of integral forming. Even if L/D is no more than 1, a rigidity of the lower lid 3 improves and the modification of the gas generator can be prevented.

The present embodiment, wherein the bottom plate 3f of the lower lid 3 and the top plate 2a of the upper lid 2 are in a ball-like shape, is described. However, the bottom plate 3f and the top plate 2a may be flat.

As gas generating agents capable of being used in the present invention, gas generating agents, wherein nitrogen containing organic-compounds such as tetrazoles compounds, triazoles compounds, azodicarbonamides compounds, and guanidines compounds are used as fuel, and oxidizing agents such as nitrates, oxohalogenates are added thereto and mixed therewith, may be illustrated.

The gas generator according to the present invention is not limited to the embodiment mentioned above. For example, it is possible to form the ignitor holding portion 3a eccentrically on the bottom plate 3f and form 2 and more ignitor holding portions.

CAPABILITY OF EXPLOITATION IN INDUSTRY

According to the gas generator for an airbag of the present invention described above, by making a lower lid of iron or steel and forming an ignitor holding portion integrally in a center thereof, it is possible to omit a joining and fixing process and a sealing process conventionally required for joining and fixing other members. It is also possible to prevent a damage of a fixing and joining portion. As a result, an organic-compound gas generating agent, wherein an internal pressure is likely to be high at the time of burning thereof, can be readily applied.

What is claimed is:

1. A gas generator comprising:
a single cylinder housing comprising an upper lid and a lower lid joined together, the upper lid having a bowl shape including a top plate portion and a side cylinder portion extending downward, the side cylinder portion being provided with a plurality of gas discharge holes, the lower lid having a bowl shape including a side cylinder portion and a bottom plate portion having a thickened wall portion, the lower lid including an ignitor holding portion including an inner side cylindrical portion, said thickened wall portion being formed as a step portion around an outer circumference of a base portion of the inner side cylindrical portion, said ignitor holding portion being formed integrally with the bottom plate portion on the thickened wall portion, the upper and lower lids comprising one of iron and steel, and said housing having substantially the same thickness except for the thickened wall portion;
an ignitor held by the ignitor holding portion by caulking in a center portion of the single cylinder housing; and
a plurality of gas generating devices provided around the ignitor in the single cylinder housing.

2. The gas generator according to claim 1, wherein the side cylinder of the upper lid has a flange extending horizontally outward therefrom.

3. The gas generator according to claim 1, wherein the ignitor holding portion further comprises a protruding portion protruding from the inner side cylindrical portion into the center portion thereof and mounting the ignitor, and a bending portion extending from the inner side cylindrical portion, bending towards a center thereof.

4. The gas generator according to claim 1, wherein the side cylinders of the upper and lower lids have an outside diameter, D, and a length, L, from the upper lid to an outer surface of the lower lid is $L/D \leq 1$.

5. The gas generator according to claim 1, wherein the plurality of gas generating devices comprises an organic-compound gas generating agent including a nitrogen containing organic compound.

6. A gas generator comprising:
a housing comprising an upper lid and a lower lid joined together, the upper lid having a bowl shape and provided with a plurality of gas discharge holes, the lower lid having a bowl shape having a side cylinder portion and a bottom plate having a thickened wall portion, the lower lid including an ignitor holding portion including an inner side cylindrical portion, said thickened wall portion being formed as a step portion around an outer circumference of a base portion of the inner side cylindrical portion, said ignitor holding portion being formed integrally with the bottom plate on the thickened wall portion, and said housing having substantially the same thickness except for the thickened wall portion;
an ignitor held by the ignitor holding portion in a center portion of the housing; and
a plurality of gas generating devices provided around the ignitor in the housing.

7. A gas generator comprising:
a single cylinder housing comprising an upper lid and a lower lid joined together, the upper lid having a bowl shape including a top plate portion and a side cylinder portion extending downward, the side cylinder portion being provided with a plurality of gas discharge holes, the lower lid having a bowl shape including a side cylinder portion and a bottom plate portion having a thickened wall portion, the lower lid including an ignitor holding portion including an inner side cylindrical portion, said thickened wall portion being formed as a step portion around an outer circumference of a base portion of the inner side cylindrical portion, said ignitor holding portion being formed integrally with the bottom plate portion on the thickened wall portion, the upper and lower lids comprising one of iron and steel, and said lower lid having substantially the same thickness except for the thickened wall portion;

an ignitor held by the ignitor holding portion by caulking in a center portion of the single cylinder housing; and a plurality of gas generating devices provided around the ignitor in the single cylinder housing.

8. A gas generator comprising:

a single cylinder housing comprising an upper lid and a lower lid joined together, the upper lid having a bowl shape including a top plate portion and a side cylinder portion extending downward, the side cylinder portion being provided with a plurality of gas discharge holes, the lower lid having a bowl shape including a side cylinder portion and a bottom plate portion having a thickened wall portion, the lower lid including an ignitor holding portion including an inner side cylindrical portion, said thickened wall portion being formed as a step portion around an outer circumference of a base portion of the inner side cylindrical portion, said ignitor holding portion being formed integrally with the bottom plate portion on the thickened wall portion, the upper and lower lids comprising one of iron and steel, and said upper lid having substantially the same thickness;

an ignitor held by the ignitor holding portion by caulking in a center portion of the single cylinder housing; and a plurality of gas generating devices provided around the ignitor in the single cylinder housing.

* * * * *